United States Patent
He et al.

(10) Patent No.: US 12,538,212 B2
(45) Date of Patent: Jan. 27, 2026

(54) IDLE MODE ENHANCEMENTS FOR NETWORK DEPLOYMENTS

(71) Applicant: QUALCOMM Incorporated, San Diego, CA (US)

(72) Inventors: Linhai He, San Diego, CA (US); Jing Jiang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 17/931,085

(22) Filed: Sep. 9, 2022

(65) Prior Publication Data

US 2024/0089836 A1    Mar. 14, 2024

(51) Int. Cl.
*H04W 4/00* (2018.01)
*H04W 24/10* (2009.01)
*H04W 36/00* (2009.01)
*H04W 36/08* (2009.01)
*H04W 48/16* (2009.01)
*H04W 48/20* (2009.01)
*H04W 76/10* (2018.01)

(52) U.S. Cl.
CPC ......... *H04W 48/16* (2013.01); *H04W 24/10* (2013.01); *H04W 36/0085* (2018.08); *H04W 36/08* (2013.01); *H04W 48/20* (2013.01); *H04W 76/10* (2018.02)

(58) Field of Classification Search
CPC . H04W 48/16; H04W 24/10; H04W 36/0085; H04W 36/08; H04W 48/20; H04W 76/10; H04W 48/12
See application file for complete search history.

(56) References Cited

U.S. PATENT DOCUMENTS

| | | | |
|---|---|---|---|
| 8,886,184 B2 * | 11/2014 | Cho ...................... | H04W 16/24 455/437 |
| 10,666,342 B1 * | 5/2020 | Landis ................. | H04B 17/318 |

(Continued)

OTHER PUBLICATIONS

International Search Report and Written Opinion—PCT/US2023/071031—ISA/EPO—Oct. 20, 2023.

*Primary Examiner* — Elisabeth Benoit Magloire
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information associated with a cell selection or reselection procedure, the configuration information indicating first policy information associated with cell selections and second policy information associated with radio resource management (RRM) measurements. The UE may monitor, in an idle mode, a broadcast channel associated with a first cell based at least in part on selecting the first cell in accordance with the configuration information. The UE may receive, from the first cell, system information associated with a second cell. The UE may establish a connection with the second cell based at least in part on the system information and one or more RRM measurements performed in accordance with the configuration information. Numerous other aspects are described.

30 Claims, 10 Drawing Sheets

(56) References Cited

U.S. PATENT DOCUMENTS

| | | | |
|---|---|---|---|
| 2016/0021584 A1* | 1/2016 | Zhang | H04W 36/0061 |
| | | | 370/331 |
| 2018/0132168 A1* | 5/2018 | Ingale | H04W 72/23 |
| 2018/0324022 A1* | 11/2018 | Sheng | H04W 36/0061 |
| 2018/0343156 A1* | 11/2018 | Malik | H04J 11/0073 |
| 2019/0174406 A1* | 6/2019 | Hwang | H04W 36/08 |
| 2020/0337050 A1* | 10/2020 | Mildh | H04W 72/56 |
| 2021/0099921 A1* | 4/2021 | Han | H04W 68/02 |
| 2021/0105643 A1* | 4/2021 | Kim | H04W 48/16 |
| 2021/0250819 A1* | 8/2021 | Yang | H04W 76/27 |
| 2021/0274472 A1* | 9/2021 | Foti | H04W 72/02 |
| 2022/0303846 A1* | 9/2022 | Sharma | H04W 48/18 |
| 2024/0196328 A1* | 6/2024 | He | H04W 76/28 |
| 2024/0292236 A1* | 8/2024 | Rydén | H04W 24/02 |
| 2025/0081279 A1* | 3/2025 | Manolakos | H04W 72/569 |

\* cited by examiner

IDLE MODE ENHANCEMENTS FOR NETWORK DEPLOYMENTS

FIELD OF THE DISCLOSURE

Aspects of the present disclosure generally relate to wireless communication and to techniques and apparatuses associated with idle mode enhancements for network deployments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled with the memory. The one or more processors may be configured to cause the UE to receive configuration information associated with a cell selection or reselection procedure, the configuration information indicating first policy information associated with cell selections and second policy information associated with radio resource management (RRM) measurements. The one or more processors may be configured to cause the UE to monitor, in an idle mode, a broadcast channel associated with a first cell based at least in part on selecting the first cell in accordance with the configuration information. The one or more processors may be configured to cause the UE to receive, from the first cell, system information associated with a second cell. The one or more processors may be configured to cause the UE to establish a connection with the second cell based at least in part on the system information and one or more RRM measurements performed in accordance with the configuration information.

Some aspects described herein relate to a network node for wireless communication. The network node may include a memory and one or more processors coupled with the memory. The one or more processors may be configured to cause the network node to receive one or more sets of system information associated with one or more cells, the one or more cells being associated with the network node or another network node. The one or more processors may be configured to cause the network node to transmit, via a first cell associated with the network node, system information, from the one or more sets of system information associated with a second cell from the one or more cells.

Some aspects described herein relate to a method of wireless communication performed by an apparatus of a UE. The method may include receiving configuration information associated with a cell selection or reselection procedure, the configuration information indicating first policy information associated with cell selections and second policy information associated with RRM measurements. The method may include monitoring, in an idle mode, a broadcast channel associated with a first cell based at least in part on selecting the first cell in accordance with the configuration information. The method may include receiving, from the first cell, system information associated with a second cell. The method may include establishing a connection with the second cell based at least in part on the system information and one or more RRM measurements performed in accordance with the configuration information.

Some aspects described herein relate to a method of wireless communication performed by an apparatus of a network node. The method may include receiving one or more sets of system information associated with one or more cells, the one or more cells being associated with the network node or another network node. The method may include transmitting, via a first cell associated with the network node, system information, from the one or more sets of system information associated with a second cell from the one or more cells.

Some aspects described herein relate to a non-transitory computer-readable medium that stores a set of instructions for wireless communication. The set of instructions, when executed by one or more processors of a UE, may cause the UE to receive configuration information associated with a cell selection or reselection procedure, the configuration information indicating first policy information associated with cell selections and second policy information associated with radio RRM measurements. The set of instructions, when executed by the one or more processors of the UE, may cause the UE to monitor, in an idle mode, a broadcast channel associated with a first cell based at least in part on selecting the first cell in accordance with the configuration information. The set of instructions, when executed by the one or more processors of the UE, may cause the UE to receive, from the first cell, system information associated with a second cell. The set of instructions, when executed by the one or more processors of UE, may cause the UE to establish a connection with the second cell based at least in part on the system information and one or more RRM measurements performed in accordance with the configuration information.

Some aspects described herein relate to a non-transitory computer-readable medium that stores a set of instructions for wireless communication by a network node. The set of instructions, when executed by one or more processors of the network node, may cause the network node to receive one or more sets of system information associated with one or more cells, the one or more cells being associated with the network node or another network node. The set of instructions, when executed by one or more processors of the network node, may cause the network node to transmit, via a first cell associated with the network node, system information, from the one or more sets of system information associated with a second cell from the one or more cells.

Some aspects described herein relate to an apparatus for wireless communication. The apparatus may include means for receiving configuration information associated with a cell selection or reselection procedure, the configuration information indicating first policy information associated with cell selections and second policy information associated with RRM measurements. The apparatus may include means for monitoring, in an idle mode, a broadcast channel associated with a first cell based at least in part on selecting the first cell in accordance with the configuration information. The apparatus may include means for receiving, from the first cell, system information associated with a second cell. The apparatus may include means for establishing a connection with the second cell based at least in part on the system information and one or more RRM measurements performed in accordance with the configuration information.

Some aspects described herein relate to an apparatus for wireless communication. The apparatus may include means for receiving one or more sets of system information associated with one or more cells, the one or more cells being associated with the network node or another network node. The apparatus may include means for transmitting, via a first cell associated with the network node, system information, from the one or more sets of system information associated with a second cell from the one or more cells.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
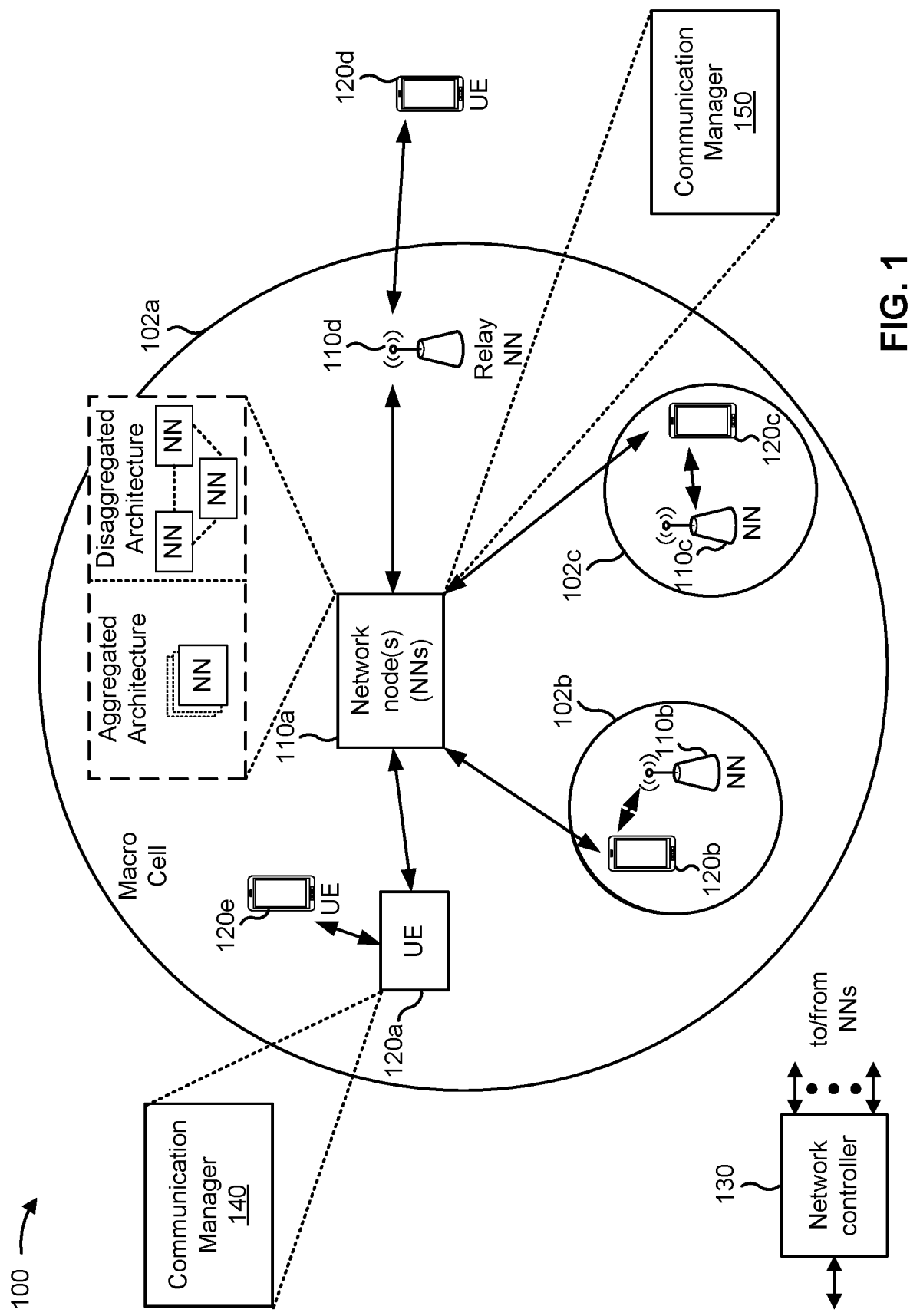
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive configuration information associated with a cell selection or reselection procedure, the configuration information indicating first policy information associated with cell selections and second policy information associated with radio resource management (RRM) measurements; monitor, in an idle mode, a broadcast channel associated with a first cell based at least in part on selecting the first cell in accordance with the configuration information; receive, from the first cell, system information associated with a second cell; and establish a connection with the second cell based at least in part on the system information and one or more RRM measurements performed in accordance with the configuration information. Additionally, or alternatively, the communication manager 140 may perform one or more other operations described herein.

In some aspects, the network node 110 may include a communication manager 150. As described in more detail elsewhere herein, the communication manager 150 may receive one or more sets of system information associated with one or more cells, the one or more cells being associated with the network node or another network node; and transmit, via a first cell associated with the network node, system information, from the one or more sets of system information associated with a second cell from the one or more cells. Additionally, or alternatively, the communication manager 150 may perform one or more other operations described herein.

As indicated above, FIG. 1 is provided as an example. Other examples may differ from what is described with regard to FIG. 1.

Figure 2:
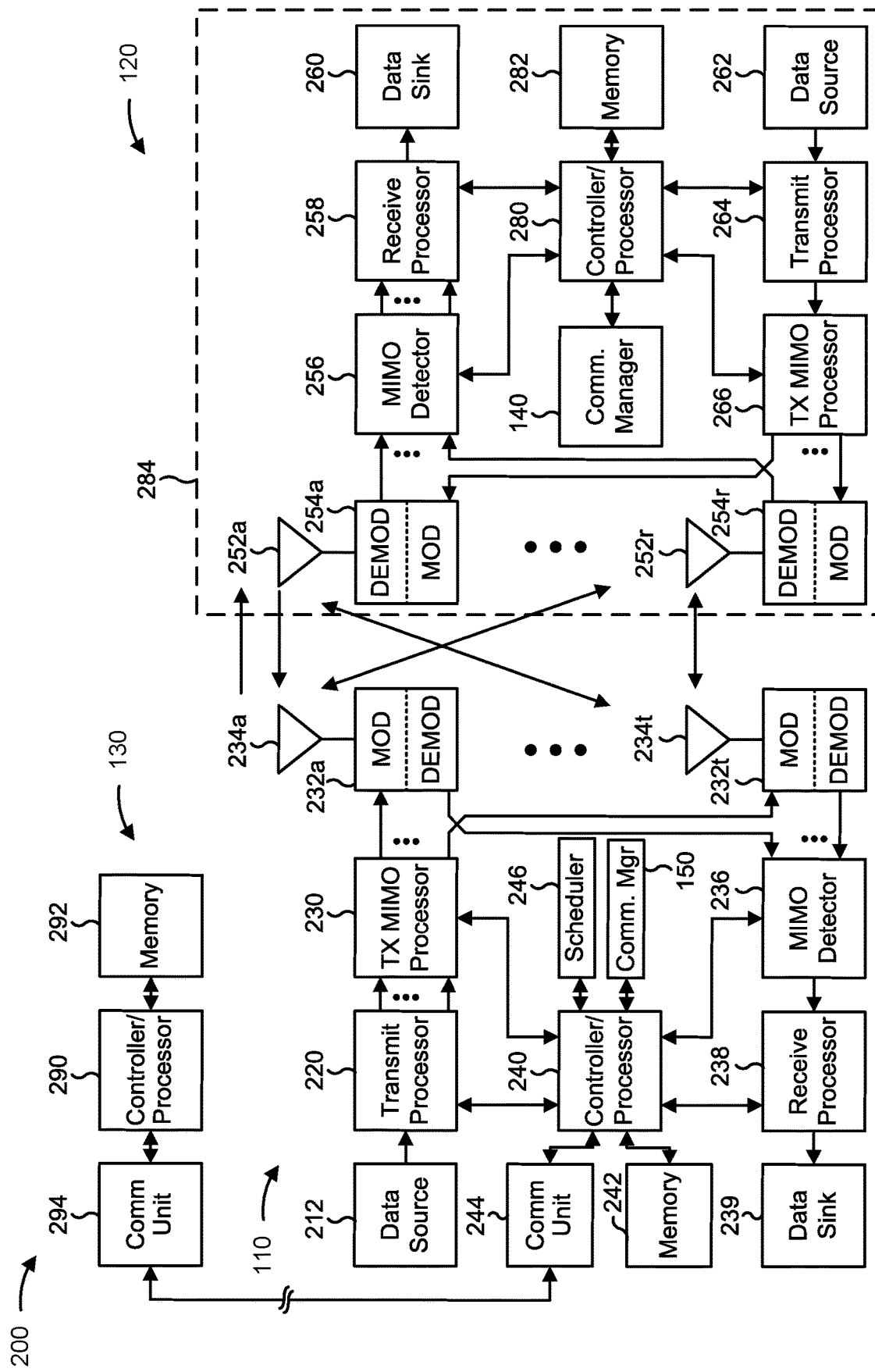
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T>1). The UE 120 may be equipped with a set of antennas 252a through 252r, such as R antennas (R>1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode)

the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the network node 110, the controller/processor 280 of the UE 120, and/or any other component(s) of FIG. 2 may perform one or more techniques associated with idle mode enhancements for network deployments, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving configuration information associated with a cell selection or reselection procedure, the configuration information indicating first policy information associated with cell selections and second policy information associated with RRM measurements; means for monitoring, in an idle mode, a broadcast channel associated with a first cell based at least in part on selecting the first cell in accordance with the configuration information; means for receiving, from the first cell, system information associated with a second cell; and/or means for establishing a connection with the second cell based at least in part on the system information and one or more RRM measurements performed in accordance with the configuration information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving one or more sets of system information associated with one or more cells, the one or more cells being associated with the network node or another network node; and/or means for transmitting, via a first cell associated with the network node, system information, from the one or more sets of system information associated with a second cell from the one or more cells. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
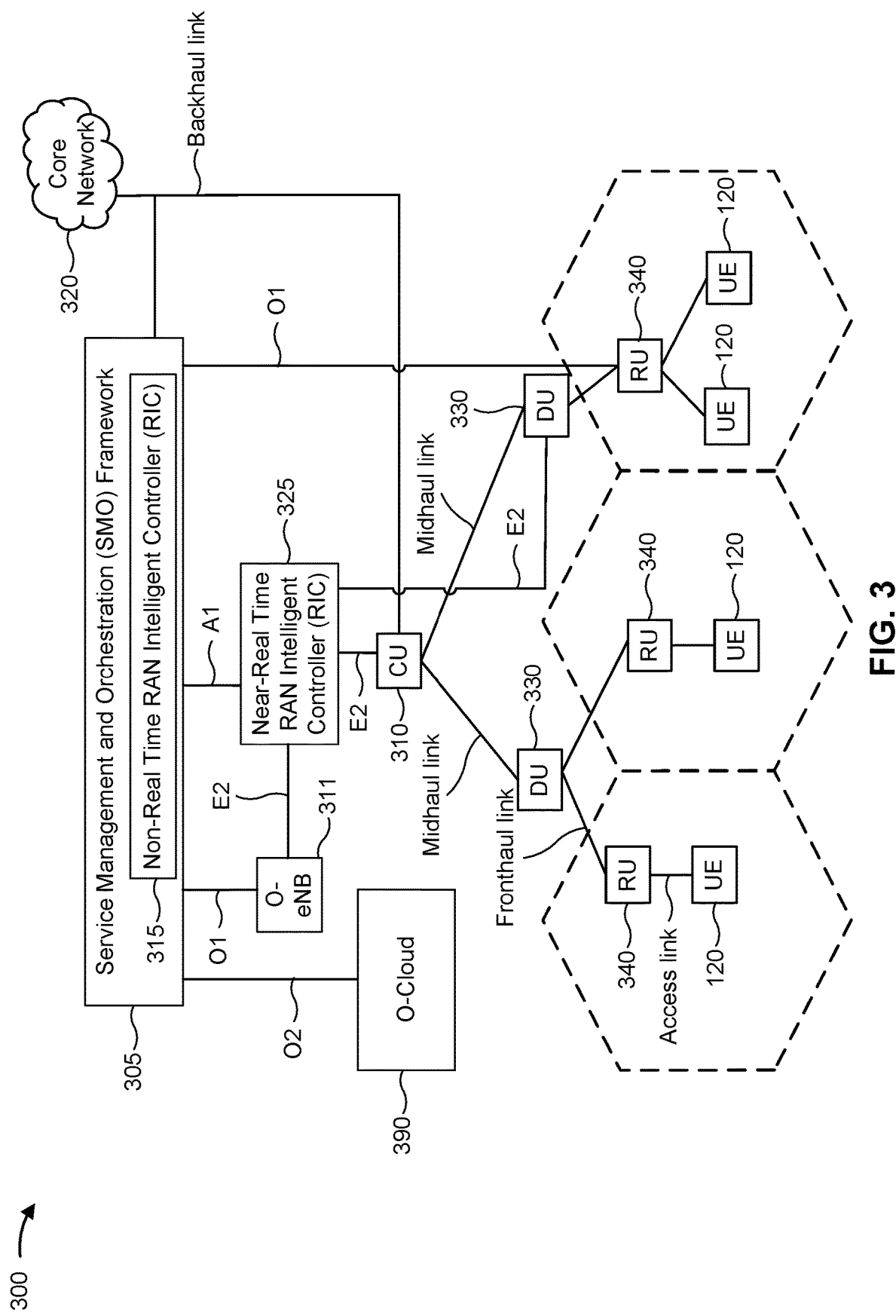
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT MC 325 and may be received at the SMO Framework 305 or the Non-RT MC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
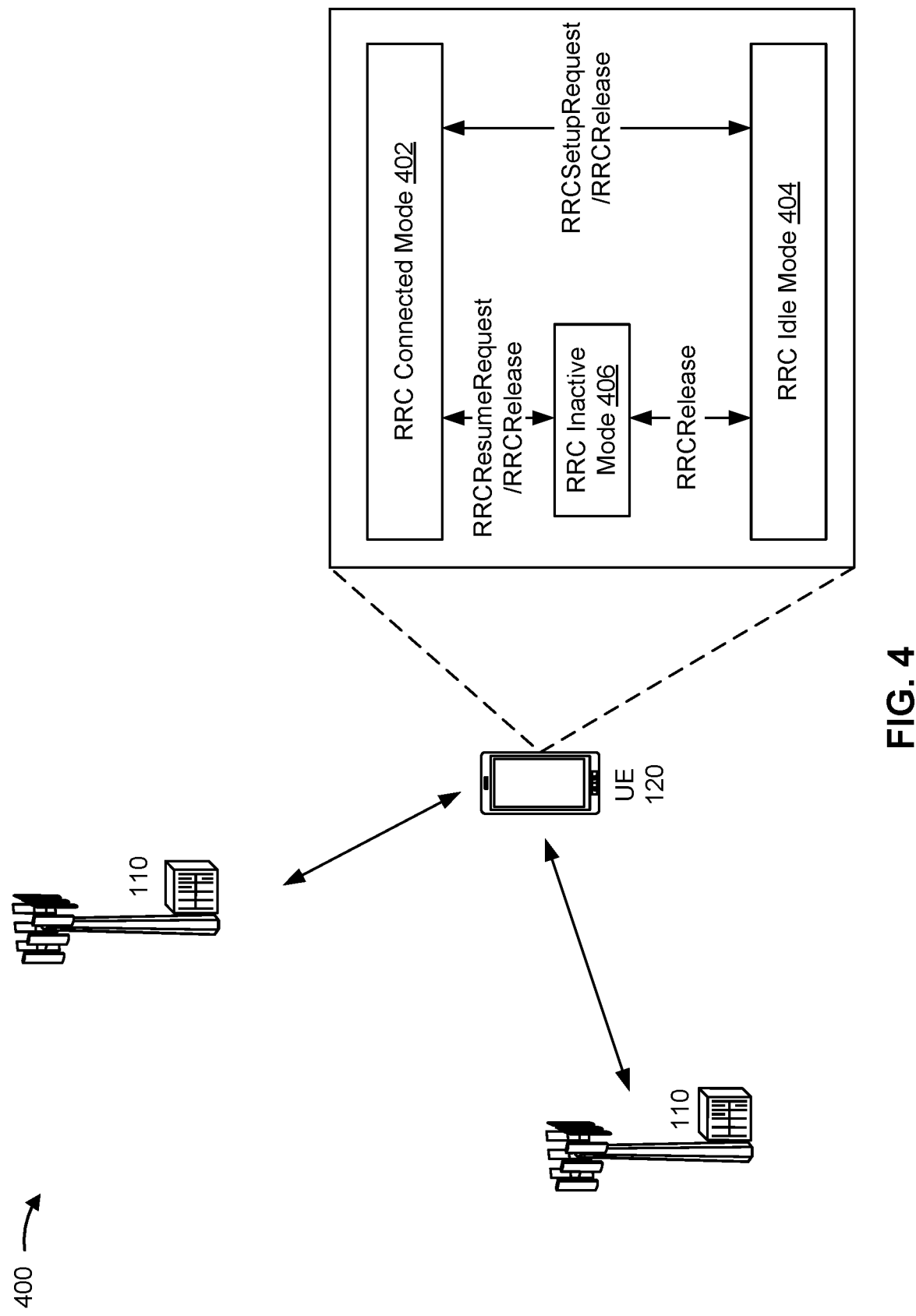
FIG. 4 is a diagram illustrating an example of a wireless network in which a UE may support additional communication modes, in accordance with the present disclosure.

FIG. 4 is a diagram illustrating an example 400 of a wireless network (e.g., wireless network 100) in which a UE (e.g., a UE 120) may support additional communication modes, in accordance with the present disclosure. The UE may be communicatively connected with one or more network nodes 110 in the wireless network. For example, the UE may be connected to the one or more network nodes 110 in a dual connectivity configuration. In this case, a first network node 110 may serve the UE as a master node and a second network node 110 may serve the UE as a secondary node.

As illustrated in FIG. 4, the UE may support a connected communication mode (e.g., an RRC connected mode 402), an idle communication mode (e.g., an RRC idle mode 404), and an inactive communication mode (e.g., an RRC inactive mode 406). The RRC connected mode 402 may also be referred to as an RRC active mode. RRC inactive mode 406 may functionally reside between RRC connected mode 402 and RRC idle mode 404.

The UE may transition between different modes based at least in part on various commands and/or communications received from the one or more network nodes 110. For example, the UE may transition from RRC connected mode 402 or RRC inactive mode 406 to RRC idle mode 404 based at least in part on receiving an RRCRelease communication. As another example, the UE may transition from RRC connected mode 402 to RRC inactive mode 406 based at least in part on receiving an RRCRelease with suspendConfig communication. As another example, the UE may transition from RRC idle mode 404 to RRC connected mode 402 based at least in part on receiving an RRCSetupRequest communication. As another example, the UE may transition from RRC inactive mode 406 to RRC connected mode 402 based at least in part on receiving an RRCResumeRequest communication.

When transitioning to RRC inactive mode 406, the UE and/or the one or more network nodes 110 may store a UE context (e.g., an access stratum (AS) context and/or higher-layer configurations). This permits the UE and/or the one or more network nodes 110 to apply the stored UE context when the UE transitions from RRC inactive mode 406 to RRC connected mode 402 in order to resume communications with the one or more network nodes 110, which reduces latency of transitioning to RRC connected mode 402 relative to transitioning to the RRC connected mode 402 from RRC idle mode 404.

In some cases, the UE may communicatively connect with a new master node when transitioning from RRC idle mode 404 or RRC inactive mode 406 to RRC connected mode 402 (e.g., a master node that is different from the last serving master node when the UE transitioned to RRC idle mode 404 or RRC inactive mode 406). In this case, the new master node may be responsible for identifying a secondary node for the UE in the dual connectivity configuration.

While operating in the RRC idle mode 404 and/or the RRC inactive mode 406, the UE may camp on a cell. "Camping" on a cell or network node may refer to the UE monitoring broadcasts from a cell (for example, monitoring a broadcast channel and/or control channel associated with the cell or the network node) to maintain readiness to actively connect with the cell or network node and utilize the wireless communication system. For example, the broadcast channel may be used to transmit system information associated with a cell and/or paging signals for the UE. A UE that has selected a cell and that is monitoring the control channel of the cell may be said to be "camped" on the cell. For example, while camping on a cell, the UE may monitor a serving cell for paging or other communications (e.g., via a broadcast channel) that indicate that the UE should transition to the RRC connected mode 402.

As indicated above, FIG. 4 is provided as an example. Other examples may differ from what is described with regard to FIG. 4.

Figure 5:
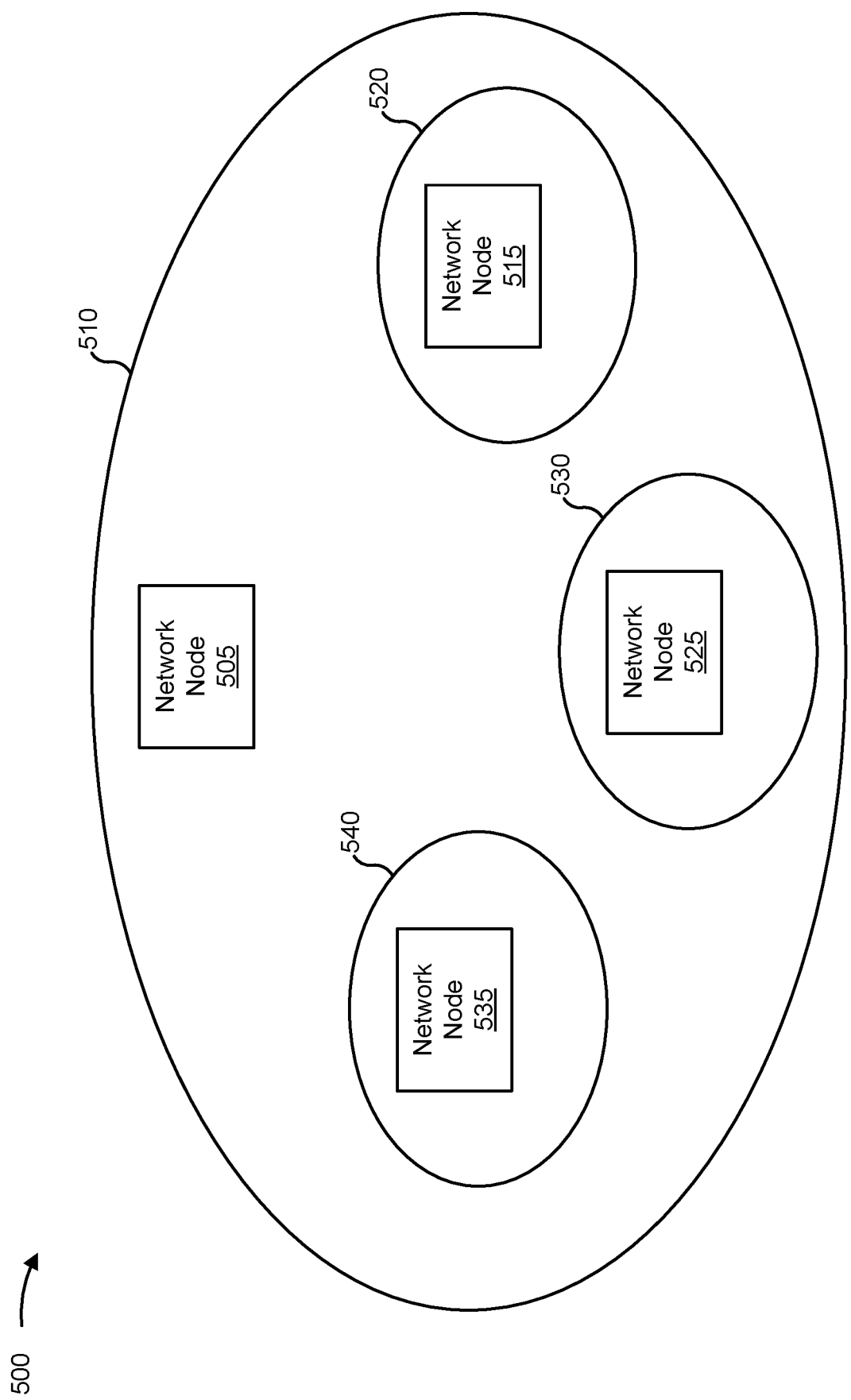
FIG. 5 is a diagram illustrating an example of a heterogenous network deployment, in accordance with the present disclosure.

FIG. 5 is a diagram illustrating an example of a heterogenous network deployment 500, in accordance with the present disclosure. The heterogenous network deployment 500 may include multiple cells. The multiple cells may be different types of cells and/or may be associated with different network nodes (e.g., different network nodes 110).

For example, as shown in FIG. 5, the heterogenous network deployment 500 may include a network node 505 (e.g., a network node 110). The network node 505 may be associated with a cell 510. The cell 510 may have a first coverage area. The heterogenous network deployment 500 may include a network node 515. The network node 515 may be associated with a cell 520. The cell 520 may have a second coverage area. Similarly, the heterogenous network deployment 500 may include a network node 525 (e.g., associated with a cell 530) and a network node 535 (e.g., associated with a cell 540). In other examples, the heterogenous network deployment 500 may include more cells and/or network nodes or fewer cells and/or network nodes.

The cell 510 may be a first type of cell. For example, the cell 510 may be associated with a first frequency band and/or a first RAT. The cell 520, the cell 530, and/or the cell 540 may be a second type of cell. For example, the cell 520, the cell 530, and/or the cell 540 may be associated with a second frequency band and/or a second RAT. In one example, the network node 505 may be a network node (e.g., a base station, an RU, a DU, and/or a CU) associated with a first RAT and the network node 515, the network node 525, and/or the network node 535 may be RUs associated with a second RAT.

For example, in the heterogenous network deployment 500, cells may be deployed that operate using high frequency bands, such as the EHF band, FR3, FR4, FR5, a sub-terahertz band (e.g., which may include frequencies that are multiple hundreds of GHz, such as 100 GHz-300 GHz), and/or other high frequency bands. The cells operating using high frequency bands (e.g., such as the cell 520, the cell 530, and/or the cell 540) may be referred to herein as "high-band cells." The high-band cells may provide increased data capacity and/or increased throughput for UEs (e.g., because of an increased bandwidth associated with the high frequency bands). For example, a UE 120 and a network node associated with a high-band cell may communicate using a larger bandwidth size, such as a 7.5 GHz bandwidth or larger bandwidth sizes, among other examples. Communicating using the larger bandwidth size may result in an increased throughput for communications between the UE 120 and the network node.

RF constraints and propagation properties that are unique to the high frequency bands may introduce new design challenges for wireless networks. For example, the high frequency bands may be associated with a high path loss. Therefore, to compensate for the high path loss, the network node and the UE 120 may communicate using narrow beams (for example, beams with a narrow beam width or signals with energy concentrated over a narrow directional range). In such examples, spatial division multiplexing (SDM) may be used (for example, where different, spatially separable antenna beams are formed for different UEs). However, the narrow beams may be susceptible to beam blockage, interference, or another intervening factor that degrades performances of signals communicated via the narrow beams. Therefore, high-band cells may be associated with a smaller coverage area (e.g., a geographic area associated with a cell) as compared to cells using a lower operating frequency (e.g., which may be referred to herein as "low-band cells"), such as the cell 510. Because of the smaller coverage areas of high-band cells, in some network deployments, high-band cells may be more densely distributed in the wireless network as compared to low-band cells. For example, as shown in FIG. 5, multiple high-band network nodes (e.g., the network node 515, the network node 525, and/or the network node 535) may be deployed within a coverage area of a single low-band network node (e.g., within a coverage area of a low-band cell, such as the cell 510).

The poor coverage associated with high-band cells may introduce challenges for initial access and idle mode (e.g., RRC idle mode) procedures of a UE. For example, a UE may select cells and/or network nodes for camping that is associated with a high frequency band. However, because of the poor coverage associated with high-band cells, the UE may have to frequently (re)select different cells (e.g., as the UE moves throughout the heterogenous network deployment 500). This may consume processing resources and/or network resources. As another example, because high-band cells may be densely deployed, the heterogenous network deployment 500 may be associated with significant overhead for system information signaling. For example, each network node and/or each cell in the heterogenous network deployment 500 may broadcast system information. Because the heterogenous network deployment 500 may be associated with an increased quantity of cells and/or network nodes, the system information signaling may consume significant network resources and/or power resources of the UE (e.g., because the UE may be required to monitor for and/or receive system information from each network node and/or each cell in the heterogenous network deployment 500).

Additionally, higher frequency bands may provide narrower beam structures and higher transmission rates, higher frequency bands may also encounter higher attenuation and diffraction losses, where a blockage of an LOS path may degrade a wireless link quality. For example, when two wireless devices are communicating with each other based on a LOS path at a higher frequency band and the LOS path is blocked by an obstacle, such as pedestrians, buildings, and/or vehicles, among other examples, the received power may drop significantly. As a result, wireless communications based on higher frequency bands may be more susceptible to environmental changes compared to lower frequency bands. To ensure that the UE and the high-band cell are communicating using a best beam or beam pair, beam management procedures may be performed by the UE and/or a network node. However, because higher frequency bands may be more susceptible to environmental changes compared to lower frequency bands, the beam management procedures may need to be performed more frequently and/or using additional beams. This may introduce significant overhead and consume network resources, processing resources, and/ or power resources of a UE (and/or a network node) associated with performing the beam management procedures.

Some techniques and apparatuses described herein enable idle mode enhancements for network deployments. For example, the UE may receive configuration information associated with a cell reselection procedure that indicates first policy information associated with cell selections (e.g., which cells are available to be selected and/or camped on by the UE) and second policy information associated with RRM measurements (e.g., which cells are to be measured by the UE). Additionally, or alternatively, the UE may receive, from a first cell, system information associated with a second cell. The UE may establish a connection with a cell (e.g., the second cell) based at least in part on the system information (e.g., received via a different cell) and one or more RRM measurements performed in accordance with the configuration information.

As a result, the UE may be enabled to receive system information and/or camp on cells that are associated with better coverage and/or higher reliability (e.g., low-band cells). The UE may be enabled to camp on cells with better coverage and/or higher reliability while still obtaining measurement information associated with other cells (e.g., high-band cells). Additionally, by enabling a cell associated with a first type of cell (e.g., a low-band cell) to transmit system information associated with cells that are associated with a second type of cell (e.g., a high-band cell), signaling overhead associated with system information signaling for a heterogenous network deployment may be reduced. Additionally, because the first type of cell may be associated with better coverage and/or higher reliability (e.g., as compared to the second type of cell), a reliability of system information signaling and/or a likelihood that the UE is enabled to receive the system information for the second type of cell may be improved. Additionally, enabling a low-band cell to transmit system information associated with a high-band cell may conserve network resources, processing resources, and/or power resources that would have otherwise been used by the high-band cell to transmit (e.g., via a beam sweep) to transmit the system information using the higher frequency bands.

As indicated above, FIG. 5 is provided as an example. Other examples may differ from what is described with regard to FIG. 5.

Figure 6:
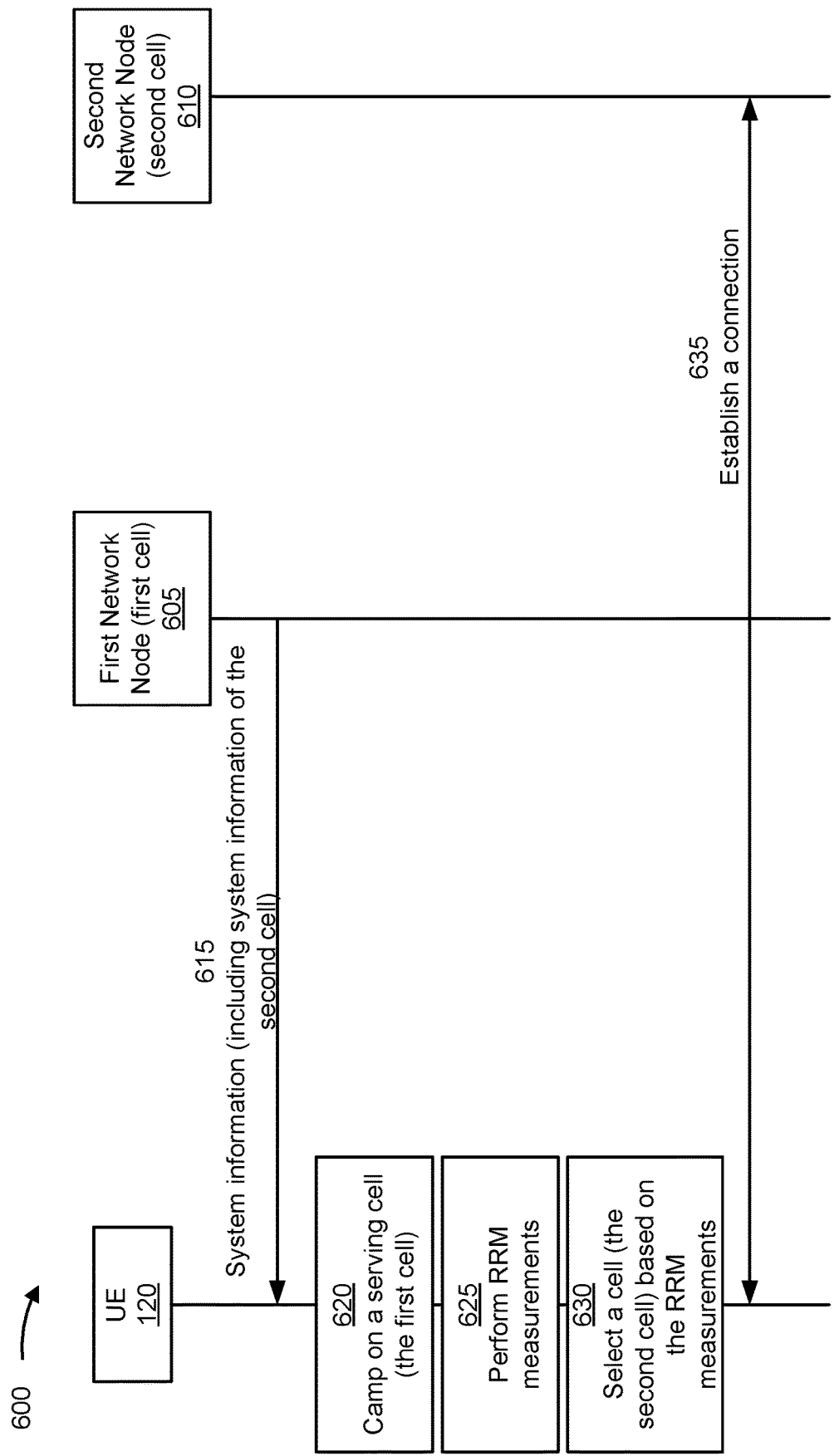
FIG. 6 is a diagram illustrating an example associated with initial access enhancements for network deployments, in accordance with the present disclosure.

FIG. 6 is a diagram illustrating an example 600 associated with initial access enhancements for network deployments, in accordance with the present disclosure. As shown in FIG. 6, a first network node 605 (e.g., a network node 110, a base station, a CU, a DU, and/or an RU) and/or second network node 610 (e.g., a network node 110, a base station, a CU, a DU, and/or an RU) may communicate with a UE 120. In some aspects, the first network node 605, the second network node 610, and the UE 120 may be part of a wireless network (e.g., the wireless network 100). In some aspects, the first network node 605, the second network node 610, and the UE 120 may be part of heterogenous network deployment, such as the heterogenous network deployment 500. For example, the first cell may be associated with a coverage area. The second cell may be included in the coverage area of the first cell.

The first network node 605 may be associated with a first cell and the second network node 610 may be associated with a second cell. In some aspects, the first cell may be an anchor cell for the second cell. As used herein, an "anchor" cell may be a cell (or a network node) that supports performing initial access procedures (e.g., contention-based random access procedures) with the UE 120 to facilitate the establishment of a connection between another cell and the UE 120 (e.g., the second cell), as described in more detail elsewhere herein. In some aspects, the second cell may be referred to as a "target" cell. A target cell may be a cell that the UE 120 identifies and/or selects for establishing a communication link or connection. In some aspects, the first cell may be associated with a first operating frequency range and/or a first RAT. The second cell may be associated with a second operating frequency range and/or a second RAT. For example, the first cell may be a low-band cell (e.g., a 5G cell and/or a cell operating using an operating frequency included in FR1 and/or FR2), and the second cell may be a high-band cell (e.g., a 6G cell and/or a cell operating using an operating frequency included FR3, FR4, FR5, the EHF band, and/or a sub-terahertz band).

In some aspects, the first cell and the second cell may be associated with different network nodes. In other aspects, the first cell and the second cell may be associated with at least one common network node. For example, the first network node 605 may be a first RU, a first base station, and/or a first DU. The second network node 610 may be a second RU, a second base station, and/or a second DU. The first network node 605 and the second network node 610 may be associated with the same control entity, such as the same DU and/or the same CU. Alternatively, the first network node 605 and the second network node 610 may be associated with different control entities.

In some aspects, actions described herein as being performed by a network node 110 (or a cell) may be performed by multiple different network nodes. For example, configuration actions may be performed by a first network node (for example, a CU or a DU), and radio communication actions may be performed by a second network node (for example, a DU or an RU). As used herein, a network node 110 "transmitting" a communication to the UE 120 may refer to a direct transmission (e.g., from the network node 110 to the UE 120) or an indirect transmission via one or more other network nodes or devices. For example, if the network node 110 is a DU, an indirect transmission to the UE 120 may include the DU transmitting a communication to an RU and the RU transmitting the communication to the UE 120. Similarly, the UE 120 "transmitting" a communication to the network node 110 may refer to a direct transmission (e.g., from the UE 120 to the network node 110) or an indirect transmission via one or more other network nodes or devices. For example, if the network node 110 is a DU, an indirect transmission to the network node 110 may include the UE 120 transmitting a communication to an RU, and the RU transmitting the communication to the DU. Additionally, the UE 120 receiving a communication from, or transmitting a communication to, a cell may refer to the UE 120 receiving the communication from, or transmitting the communication to, a network node associated with the cell.

In some aspects, the UE 120 may transmit, and the first network node 605 and/or the second network node 610 may receive, a capability report. The capability report may indicate that the UE 120 supports performing idle mode operations as described in more detail elsewhere herein. For example, the UE 120 may transmit an indication that the UE 120 supports receiving, via a first cell, system information associated with a second cell, as described in more detail elsewhere herein. As another example, the UE 120 may transmit an indication that the UE 120 supports receiving system information via differential information and/or pre-configured indices, among other examples.

As shown by reference number 615, the first network node 605 (e.g., the first cell) may transmit, and the UE 120 may receive, one or more system information communications. For example, the one or more system information communications may include one or more system information blocks (SIBs). In some aspects, the one or more system information communications may include a master information block (MIB). In some aspects, the one or more system information communications may include an initial access configuration associated with the first cell. For example, the initial access configuration may include one or more random access channel (RACH) configurations and/or one or more physical RACH (PRACH) configurations. For example, the UE 120 may receive, and the first network node 605 (or the first cell) may transmit, an indication of the initial access configuration associated with the first cell.

In some aspects, the first network node 605 (e.g., the first cell) may transmit, and the UE 120 may receive, system information associated with the second cell. For example, the first network node 605 and/or the first cell may serve as an anchor cell for one or more cells including the second cell. The first cell (e.g., an anchor cell) may broadcast an indication of system information for cells that the first cell supports (e.g., the second cell). The first network node 605 (e.g., the first cell) may receive one or more sets of system information associated with the one or more cells. For example, the first network node 605 may communicate with other network nodes, such as the second network node 610, to obtain system information associated with the one or more cells supported by the first cell. In some aspects, the first network node 605 (e.g., the first cell) may receive the one or more sets of system information associated with the one or more cells from a control entity, such as a CU or a core network node, among other examples. The first network node 605 and/or the first cell may broadcast indications of the one or more sets of system information, as described in more detail elsewhere herein. For example, the first network node 605 (and/or the first cell) may transmit, and the UE 120 may receive, system information associated with the second cell. The first network node 605 (and/or the first cell) may transmit system information associated with other cells in a similar manner as described herein in connection with the system information associated with the second cell.

For example, the first network node 605 (and/or the first cell) may transmit, and the UE 120 may receive, an indication of the system information as differential information relative to system information associated with the first cell. For example, as described above, the first network node 605 and/or the first cell may broadcast one or more SIBs and/or a MIB associated with the first cell. In some aspects, the system information associated with the second cell may be at least partially the same as the system information associated with the first cell. Therefore, to reduce a size of the signaling of the system information associated with the second cell, the first network node 605 (and/or the first cell) may transmit an indication of the system information of the second cell that is different than the system information associated with the first cell (e.g., and may not transmit an indication of system information that is the same as the system information associated with the first cell).

For example, if the UE 120 does not receive an indication of one or more system information parameters for the second cell, then the UE 120 may assume that the one or more system information parameters are associated with the same information or value as the one or more parameters indicated via the system information associated with the first cell. In other words, an anchor cell's (e.g., the first cell's) MIB and/or SIBs may be used as a baseline for signaling the system information associated with other cells (e.g., the second cell) by the anchor cell. For the other cells, the anchor cell (e.g., the first cell) may only signal the difference with that of the anchor cell's (e.g., the first cell's) MIB and/or SIBs. This may reduce a signaling overhead associated with indicating the system information associated with the second cell and/or other cells included in the wireless network (e.g., high-band cells).

Additionally, or alternatively, the first network node 605 and/or the first cell may transmit system information associated with other cells only in spatial directions that are toward other cells. For example, the first network node 605 and/or the first cell may be associated with a set of beams. The second cell may be positioned (e.g., geographically) in a spatial direction relative to a position of the first cell. The first network node 605 and/or the first cell may transmit system information associated with the second cell using a subset of beams, from the set of beams, that are associated with the spatial direction toward the second cell. In other words, the first network node 605 and/or the first cell may transmit system information associated with the second cell only via beams that overlap with a spatial direction toward a coverage area of the second cell.

For example, it may not be beneficial to transmit system information associated with the second cell in a spatial direction that is not toward the coverage area of the second cell because UEs that may receive the system information may not be in, or near, a coverage area of the second cell. Therefore, to conserve spatial resources and/or a signaling overhead associated with transmitting the system information associated with the second cell, the first network node 605 and/or the first cell may transmit an indication of the system information via the subset of beams, from the set of beams, that are associated with the spatial direction toward a coverage area of the second cell. The UE 120 may receive the indication of the system information via a beam (e.g., a transmission beam and/or a spatial beam) that is included in the subset of beams. The first network node 605 and/or the first cell may determine geographic locations of other cells, including the second cell, based at least in part on communicating with the other cells and/or a control entity (such as a CU or a core network node). The first network node 605 and/or the first cell may determine the subset of beams via which the system information associated with the second cell is to be transmitted based at least in part on a geographic location of a coverage area of the second cell. The first network node 605 and/or the first cell may transmit system information for another cell via other beams, from the set of beams, that are associated with the spatial direction toward a coverage area of the other cell, in a similar manner as described herein.

Additionally, or alternatively, the first network node 605 and/or the first cell may signal the system information associated with the second cell via one or more index values. For example, cells located in, or near, the same tracking area may be associated with similar, or the same, system information. Therefore, the network (e.g., the first network node 605 or another network node) may configure one or more sets of system information (e.g., one or more possible sets of system information). The network (e.g., the first network node 605 or another network node) may configure one or more sets of system information to be associated with, or mapped to, respective index values. Therefore, when the first network node 605 and/or the first cell transmits the indication of the system information associated with the second cell, the first network node 605 and/or the first cell may transmit an indication of one or more index values corresponding to one or more of the configured possible sets of system information.

For example, the UE 120 may receive one or more system information sets associated with respective index values. For example, the UE 120 may receive the one or more system information sets and/or corresponding index values via an initial attachment communication, a radio resource control communication, or a tracking area update communication. The UE 120 may receive, via the first cell, an indication of an index value, from the respective index values, that is associated with a system information set, from the one or more system information sets, that includes the system information associated with the second cell. The UE 120 may identify the system information associated with the second cell based at least in part on the one or more index values signaled by the first network node 605 and based at least in part on the configured set(s) of system information.

For example, during initial attachment or a tracking area update, the network may provide the UE 120 with a set of system information used by cells in the tracking area. For the second cell, the anchor cell (e.g., the first cell) may signal an index value of the configured system information that the second cell uses. In some aspects, the first network node 605 and/or the first cell may transmit, and the UE 120 may receive, additional system information associated with the second cell. The additional system information may override or replace information indicated by the configured system information (e.g., that is indicated via an index value signaled to the UE 120, as described elsewhere herein).

In some aspects, the UE 120 may receive a single index value corresponding to a set of system information that is associated with the second cell. In other aspects, multiple index values may be signaled corresponding to subsets of system information associated with the second cell. Enabling the first network node 605 and/or the first cell to use multiple index values may provide additional flexibility for the first network node 605 and/or the first cell to signal system information associated with other cells. Enabling the first network node 605 and/or the first cell to use index value(s) to signal system information associated with other cells may reduce a size of the signaling because the first network node 605 and/or the first cell may not transmit all of the system information associated with the other cells.

Additionally, or alternatively, the first network node 605 and/or the first cell may transmit, and the UE 120 may receive, an indication of first system information associated with the second cell. The UE 120 may receive first system information associated with the second cell via the second cell (e.g., after establishing a connection with the second cell). For example, the first system information may be minimum system information (e.g., basic information required for initial access and for acquiring any other system information). In some aspects, the first system information may include information indicated via an MIB and/or an SIB1 associated with the second cell. In some aspects, the first system information may include access control information, such as cell barring information, and/or an intra-frequency reselection indication (IFRI), among other examples. The second system information may be on-demand system information. The UE 120 may perform a first random access procedure with the first network node 605 to obtain the access control information. The UE 120 may perform a second random access procedure with the second network node 610 to obtain other system information associated with the second cell. For example, the first random access procedure may be configured for requesting system information (e.g., may use random access channel resources that are configured for requesting system information).

For example, the anchor cell (e.g., the first cell) may broadcast basic system information associated with neighbor cells (e.g., associated with the second cell). This may reduce a signaling overhead associated with the first network node 605 and/or the first cell transmitting the system information associated with the second cell. The UE 120 may use an on-demand system information acquisition procedure to obtain other system information associated with the second cell (e.g., to obtain other SIBs associated with the second cell). In some aspects, the UE 120 may receive the other system information associated with the second cell via the first cell after establishing a connection (e.g., an RRC connected connection) with the first cell. For example, the UE 120 may perform a RACH procedure to establish a connection (e.g., in the RRC connected mode) with the first cell. The UE 120 may receive the second system information (e.g., the other system information and/or the on-demand system information) via the first cell after establishing the connection with the first cell.

In some examples, an anchor cell (e.g., the first cell) may group SIB common information together (e.g., for a cell specific configuration). For example, the SIB common information may be mapped (e.g., in a systematic way) to a cell identifier of a target cell (e.g., the second cell). In this way, the UE may be enabled to decode (e.g., automatously) the SIB common information based at least in part on a measurement of the target cell (e.g., to facilitate handover and/or other mobility operations).

In some aspects, a combination of the above signaling techniques may be used by the first network node 605 and/or the first cell to signal the system information associated with the second cell. For example, differential signaling and beam specific signaling may be used by the first network node 605 and/or the first cell to signal the system information associated with the second cell. As another example, beam specific signaling and index values may be used by the first network node 605 and/or the first cell to signal the system information associated with the second cell. As another example, differential signaling, beam specific signaling, and index values may be used by the first network node 605 and/or the first cell to signal the system information associated with the second cell. As another example, basic and/or minimum system information may be signaled by the first network node 605 and/or the first cell via differential signaling, beam specific signaling, and/or index values. Any other combinations of the techniques described in more detail herein may be used by the first network node 605 and/or the first cell to signal the system information associated with the second cell.

As shown by reference number 620, the UE 120 may camp on a serving cell. For example, the serving cell may be the first cell (e.g., that is associated with the first network node 605). For example, the UE 120 may monitor a control channel (e.g., a physical downlink control channel (PDCCH)) associated with the first cell. For example, the UE 120 may be operating in an idle mode (e.g., an RRC idle mode). The UE 120 may select the first cell to be the serving cell based at least in part on configuration information associated with a cell reselection procedure.

For example, the UE 120 may receive configuration information. The first network node 605, the second network node 610, or another network node may transmit the configuration information. In some aspects, the UE 120 may receive the configuration information via one or more of RRC signaling, one or more medium access control (MAC) control elements (MAC-CEs), and/or downlink control information (DCI), among other examples. In some aspects, the configuration information may include an indication of one or more configuration parameters (e.g., stored by the UE 120 and/or previously indicated to the UE 120) for selection by the UE 120, and/or explicit configuration information for the UE 120 to use to configure itself, among other examples. In some aspects, the UE 120 may receive the configuration information via the system information (e.g., received by the UE 120 as described above in connection with reference number 615). In other aspects, the UE 120 may receive the configuration information via another communication (e.g., after establishing a connection, such as an RRC connected mode connection, with a network node).

The configuration information may be associated with a cell selection or reselection procedure. For example, the configuration information may indicate one or more parameters defining a manner in which the UE 120 is to select or reselect serving cells and/or cells to establish a connection with. For example, the configuration information may indicate cell barring information, one or more cell selection criteria conditions (e.g., one or more S conditions, such as a cell selection receive level (Srxlev) parameter, and/or a cell selection receive signal quality (Squal) parameter, among other examples).

In some aspects, the configuration information may indicate priority levels associated with various cells for RRM measurements. For example, the UE 120 may be configured with priority levels for different frequencies based on cell (re)selection priority. For example, the configuration information may indicate that low-band frequencies (e.g., including a frequency used by the first cell) are associated with a first priority level and that high-band frequencies (e.g., including a frequency used by the second cell) are associated with a second priority level. The first priority level may indicate a higher priority than a priority indicated by the second priority level. Therefore, the UE 120 may be more likely to select a low-band cell to be the serving cell of the UE 120 while the UE 120 is operating in the RRC idle mode. Because the low-band cell (e.g., the first cell) may be associated with improved coverage and/or reliability (e.g., as compared to a high-band cell, such as the second cell), this may improve communication performance of the UE 120 in the RRC idle mode.

Additionally, this may enable the UE 120 to perform measurements (e.g., RRM measurements) of the high-band cells to obtain information associated with the high-band cells while operating in the RRC idle mode.

Additionally, or alternatively, the configuration information may indicate cell barring information (e.g., indicating cells that are permitted and/or not permitted to be selected by the UE 120 as a serving cell for camping). For example, the configuration information may indicate that low-band cells (e.g., including the first cell) are permitted to be selected by the UE 120 as a serving cell for camping (e.g., low-band cells may be included in a whitelist indicated by the configuration information). Additionally, the configuration information may indicate that high-band cells (e.g., including the second cell) are not permitted to be selected by the UE 120 as a serving cell for camping (e.g., high-band cells may be included in a blacklist indicated by the configuration information). In such examples, the UE 120 may not perform measurements (e.g., RRM measurements) of associated cells (e.g., high-band cells, such as the second cell) that are indicated as not being permitted to be selected by the UE 120.

In some aspects, the configuration information may indicate first policy information associated with cell selections and second policy information associated with RRM measurements. For example, the configuration information may indicate first policy or configuration information associated with cells that are permitted to be selected by the UE 120 as a serving cell and second policy or configuration information associated with cells that are to be measured by the UE 120 in the RRC idle mode.

For example, the first policy information may indicate that a first type of cell is permitted to be selected for camping and that a second type of cell is not permitted to be selected for camping. The first type of cell may be associated with a first frequency band (e.g., low-band cells) and the second type of cell may be associated with a second frequency band (e.g., high-band cells). For example, the first policy information may indicate that low-band cells (e.g., including the first cell) are permitted to be selected by the UE 120 as a serving cell for camping and that high-band cells (e.g., including the second cell) are not permitted to be selected by the UE 120 as a serving cell for camping.

The second policy information may indicate that the first type of cell is associated with a first priority level and that the second type of cell is associated with a second priority level for the RRM measurements. For example, the first priority level may indicate a higher priority than the second priority level. Therefore, the UE 120 may prioritize measuring low-band cells, but may still measure high-band cells. Therefore, the first policy information may ensure that the UE 120 selects a low-band cell to be the serving cell for camping in the RRC idle mode and the second policy information may enable the UE 120 to perform measurements (e.g., RRM measurements) of the high-band cells to obtain information associated with the high-band cells while operating in the RRC idle mode. This may improve communication performance of the UE 120 in the RRC idle mode (e.g., by enabling the UE 120 to camp on cells with better coverage and/or higher reliability) while also enabling the UE 120 to obtain measurements of high-band cells to reduce a latency associated with establishing active connections with a high-band cell when the UE 120 transitions to the RRC connected mode.

The UE 120 may select the first cell to be the serving cell for the RRC idle mode in accordance with the configuration information. For example, the UE 120 may camp on the first cell. The UE 120 may monitor for paging communications transmitted via the first cell. In some aspects, such as where the UE 120 is only permitted to select low-band or anchor cells as the serving cell, the network may cause paging communications to only be transmitted via low-band or anchor cells. In other aspects, where the UE 120 is permitted to select a high-band cell (such as the second cell) as the serving cell, the network may cause paging communications to be transmitted via all possible cells for the UE 120. For example, the network (e.g., a network node, a CU, a DU, or a core network node) may determine whether a high-band cell is located outside of a coverage area of any low-band or anchor cells. If so, then the network may configure a paging channel for the high-band cell and may ensure that paging notifications for the UE 120 are transmitted via all possible cells.

As shown by reference number 625, the UE 120 may perform one or more measurements (e.g., RRM measurements) of one or more cells while operating in the RRC idle mode. For example, the UE 120 may perform the one or more RRM measurements in accordance with the configuration information, as described above. For example, the UE 120 may perform one or more measurements of the first cell (e.g., based at least in part on signal(s) transmitted via the first network node 605) and/or one or more measurements of the second cell (e.g., based at least in part on signal(s) transmitted via the second network node 610). The UE 120 may perform the one or more RRM measurements while camping on the first cell. For example, the UE 120 may select the first cell as the serving cell in the RRC idle mode (e.g., in accordance with the configuration information).

As shown by reference number 630, the UE 120 may select the second cell, from one or more cells associated with the one or more RRM measurements, based at least in part on the one or more RRM measurements. For example, the UE 120 may select the second cell for establishing an active connection (e.g., an RRC connected mode connection). For example, the UE 120 may determine that a measurement of the second cell satisfies one or more thresholds (e.g., indicated by the cell selection criteria) and/or that a measurement of the second cell is a highest measurement value obtained by the UE 120 while performing the RRM measurements.

As shown by reference number 635, the UE 120 may establish a connection with the second cell (e.g., based on selecting the second cell). In some aspects, the UE 120 may establish a connection with the first cell (e.g., the serving cell) prior to establishing the connection with the second cell. For example, after establishing the connection with the first cell, the UE 120 may be configured to perform measurements of the second cell (e.g., and other high-band cells) by the first cell and/or the first network node 605. The UE 120 may report measurement values to the first cell and/or the first network node 605. The UE 120 may be handed over to the second cell based at least in part on the reported measurements (e.g., based at least in part on a measurement value of the second cell satisfying a threshold and/or being greater than (e.g., by a certain amount) a measurement value of the first cell).

In some other aspects, the UE 120 may establish the connection with the second cell without establishing a connected radio resource control connection with the first cell (e.g., the serving cell). For example, as described above, the UE 120 may perform measurements (e.g., RRM measurements) of the second cell while operating in the RRC idle mode. The UE 120 may select the second cell (while operating in the RRC idle mode) based at least in part on the measurements. The UE 120 may perform an initial access procedure (e.g., a RACH procedure) directly with the second cell. In other words, based at least in part on RRM measurements performed by the UE 120 while operating in the RRC idle mode, the UE 120 may determine which cell, among low-band cells (e.g., the first cell) and high-band cells (e.g., the second cell) evaluated by the UE 120, is the best for network access and an RRC connection. The UE 120 may perform initial access directly with the selected cell (e.g., without performing a RACH procedure with the serving cell). This may enable the UE 120 to quickly establish an active connection (e.g., in the RRC connected mode) with the cell associated with a best measurement value.

As a result, the UE 120 may be enabled to receive system information and/or camp on cells that are associated with better coverage and/or higher reliability (e.g., low-band cells, such as the first cell). The UE 120 may be enabled to camp on cells with better coverage and/or higher reliability while still obtaining measurement information associated with other cells (e.g., high-band cells, such as the second cell). Additionally, by enabling a cell associated with a first type of cell (e.g., a low-band cell, such as the first cell) to transmit system information associated with cells that are associated with a second type of cell (e.g., a high-band cell, such as the second cell), signaling overhead associated with system information signaling for a heterogenous network deployment may be reduced. Additionally, because the first type of cell may be associated with better coverage and/or higher reliability (e.g., as compared to the second type of cell), a reliability of system information signaling and/or a likelihood that the UE 120 is enabled to receive the system information for the second type of cell may be improved.

As indicated above, FIG. 6 is provided as an example. Other examples may differ from what is described with regard to FIG. 6.

Figure 7:
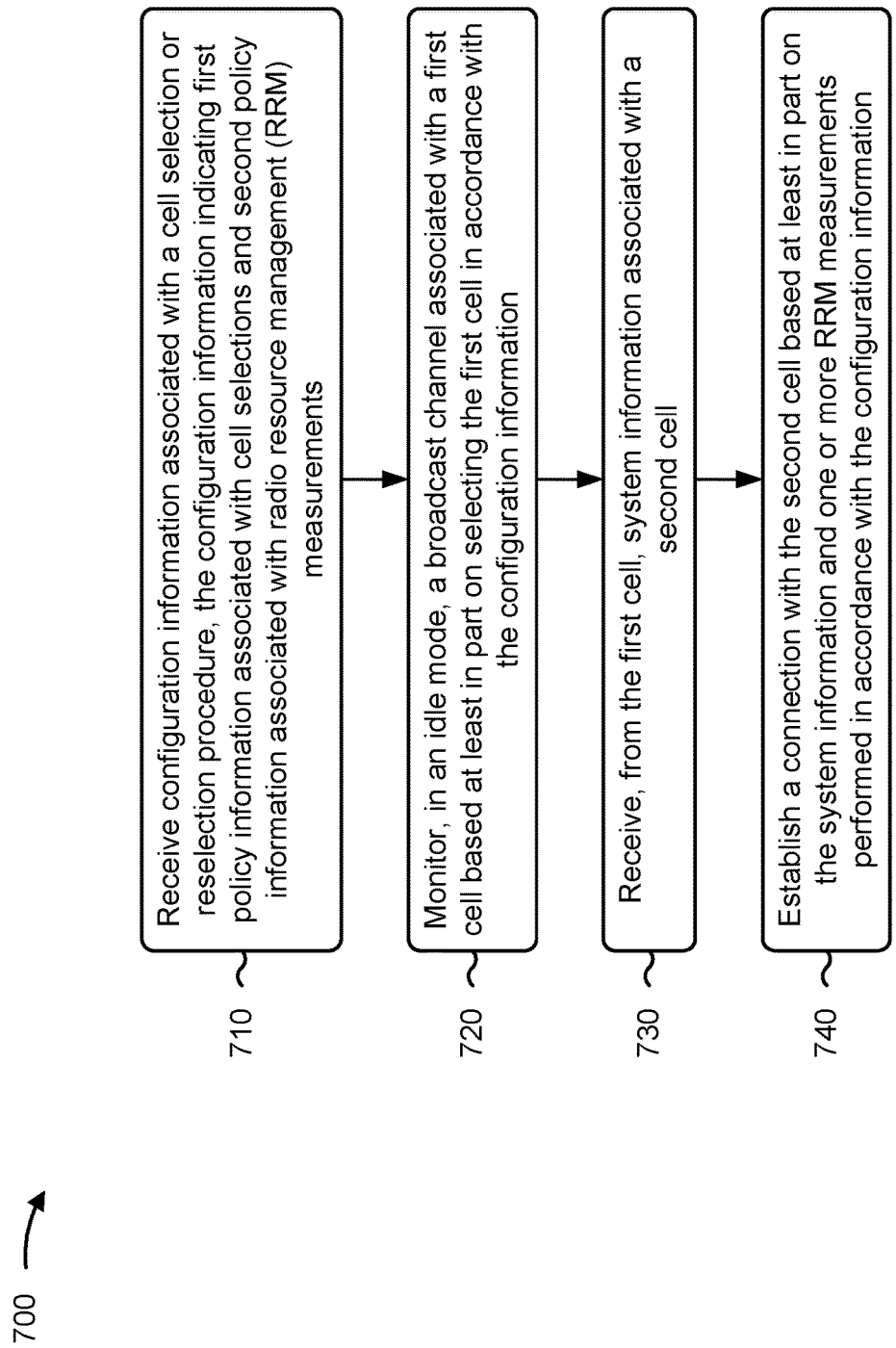
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., the UE 120) performs operations associated with idle mode enhancements for network deployments.

As shown in FIG. 7, in some aspects, process 700 may include receiving configuration information associated with a cell selection or reselection procedure, the configuration information indicating first policy information associated with cell selections and second policy information associated with RRM measurements (block 710). For example, the UE (e.g., using communication manager 140 and/or reception component 902, depicted in FIG. 9) may receive configuration information associated with a cell selection or reselection procedure, the configuration information indicating first policy information associated with cell selections and second policy information associated with RRM measurements, as described above.

As further shown in FIG. 7, in some aspects, process 700 may include monitoring, in an idle mode, a broadcast channel associated with a first cell based at least in part on selecting the first cell in accordance with the configuration information (block 720). For example, the UE (e.g., using communication manager 140 and/or monitoring component 908, depicted in FIG. 9) may monitor, in an idle mode, a broadcast channel associated with a first cell based at least in part on selecting the first cell in accordance with the configuration information, as described above.

As further shown in FIG. 7, in some aspects, process 700 may include receiving, from the first cell, system information associated with a second cell (block 730). For example, the UE (e.g., using communication manager 140 and/or reception component 902, depicted in FIG. 9) may receive, from the first cell, system information associated with a second cell, as described above.

As further shown in FIG. 7, in some aspects, process 700 may include establishing a connection with the second cell based at least in part on the system information and one or more RRM measurements performed in accordance with the configuration information (block 740). For example, the UE (e.g., using communication manager 140 and/or connection establishment component 910, depicted in FIG. 9) may establish a connection with the second cell based at least in part on the system information and one or more RRM measurements performed in accordance with the configuration information, as described above.

Process 700 may include additional aspects, such as any single aspect or any combination of aspects described below and/or in connection with one or more other processes described elsewhere herein.

In a first aspect, the first policy information indicates that a first type of cell is permitted to be selected for monitoring the broadcast channel and that a second type of cell is not permitted to be selected for monitoring the broadcast channel, and the second policy information indicates that the first type of cell is associated with a first priority level and that the second type of cell is associated with a second priority level for the RRM measurements.

In a second aspect, alone or in combination with the first aspect, the first type of cell is associated with a first frequency band and the second type of cell is associated with a second frequency band.

In a third aspect, alone or in combination with one or more of the first and second aspects, the system information associated with the second cell is first system information, and receiving the system information associated with the second cell comprises receiving, from the first cell, an indication of the first system information as differential information relative to second system information associated with the first cell.

In a fourth aspect, alone or in combination with one or more of the first through third aspects, the first cell is associated with a set of beams, and receiving the system information associated with the second cell comprises receiving, from the first cell, an indication of the system information via a beam included in a subset of beams from the set of beams, wherein the subset of beams are associated with a spatial direction toward the second cell with respect to a location of the first cell.

In a fifth aspect, alone or in combination with one or more of the first through fourth aspects, process 700 includes receiving one or more system information sets associated with respective index values, and receiving the system information associated with the second cell comprises receiving, from the first cell, an indication of an index value, from the respective index values, that is associated with a system information set, from the one or more system information sets, that includes the system information.

In a sixth aspect, alone or in combination with one or more of the first through fifth aspects, the one or more system information sets are included in an initial attachment communication, a radio resource control communication, or a tracking area update communication.

In a seventh aspect, alone or in combination with one or more of the first through sixth aspects, the system information associated with the second cell is first system information, and process 700 includes receiving, from the second cell, second system information associated with the second cell after establishing the connection.

In an eighth aspect, alone or in combination with one or more of the first through seventh aspects, the first system information is access control information that includes at least one of celling barring information, or an IFRI; and the access control information is received via a random access procedure, with the first cell, that is configured for requesting system information.

In a ninth aspect, alone or in combination with one or more of the first through eighth aspects, establishing the connection comprises performing, while camping on the first cell, the one or more RRM measurements in accordance with the configuration information, selecting the second cell, from one or more cells associated with the one or more RRM measurements, based at least in part on the one or more RRM measurements, and establishing the connection with the second cell without establishing a connected radio resource control connection with the first cell.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
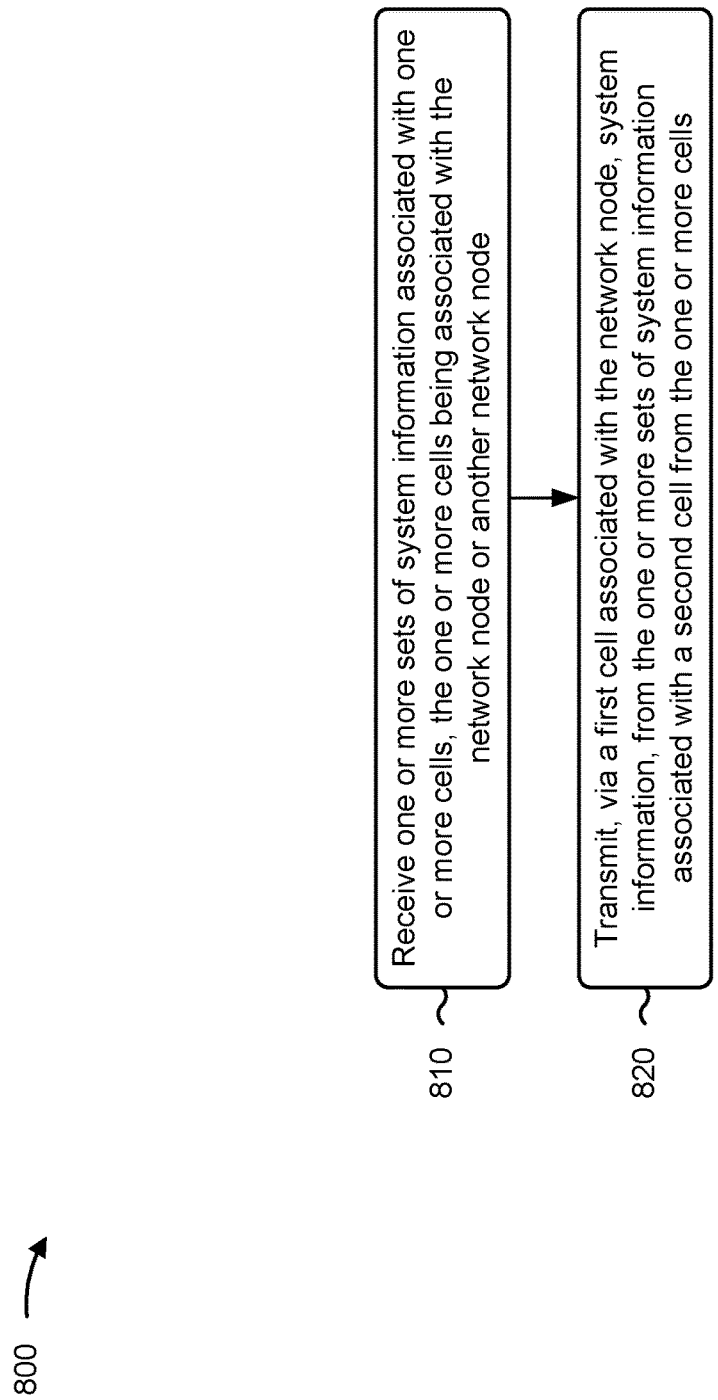
FIG. 8 is a diagram illustrating an example process performed, for example, by a network node, in accordance with the present disclosure.

FIG. 8 is a diagram illustrating an example process 800 performed, for example, by a network node, in accordance with the present disclosure. Example process 800 is an example where the network node (e.g., a network node 110 and/or the first network node 605) performs operations associated with idle mode enhancements for network deployments.

As shown in FIG. 8, in some aspects, process 800 may include receiving one or more sets of system information associated with one or more cells, the one or more cells being associated with the network node or another network node (block 810). For example, the network node (e.g., using communication manager 150 and/or reception component 1002, depicted in FIG. 10) may receive one or more sets of system information associated with one or more cells, the one or more cells being associated with the network node or another network node, as described above.

As further shown in FIG. 8, in some aspects, process 800 may include transmitting, via a first cell associated with the network node, system information, from the one or more sets of system information associated with a second cell from the one or more cells (block 820). For example, the network node (e.g., using communication manager 150 and/or transmission component 1004, depicted in FIG. 10) may transmit, via a first cell associated with the network node, system information, from the one or more sets of system information associated with a second cell from the one or more cells, as described above.

Process 800 may include additional aspects, such as any single aspect or any combination of aspects described below and/or in connection with one or more other processes described elsewhere herein.

In a first aspect, process 800 includes transmitting configuration information associated with a cell selection or reselection procedure, the configuration information indicating first policy information associated with cell selections and second policy information associated with RRM measurements.

In a second aspect, alone or in combination with the first aspect, the first policy information indicates that a first type of cell is permitted to be selected for camping and that a second type of cell is not permitted to be selected for camping, and the second policy information indicates that the first type of cell is associated with a first priority level and that the second type of cell is associated with a second priority level for the RRM measurements.

In a third aspect, alone or in combination with one or more of the first and second aspects, the first type of cell is associated with a first frequency band and the second type of cell is associated with a second frequency band.

In a fourth aspect, alone or in combination with one or more of the first through third aspects, the system information associated with the second cell is first system information, and transmitting the system information associated with the second cell comprises transmitting, via the first cell, an indication of the first system information as differential information relative to second system information associated with the first cell.

In a fifth aspect, alone or in combination with one or more of the first through fourth aspects, the network node is associated with a set of beams available for transmissions, and transmitting the system information associated with the second cell comprises transmitting an indication of the system information via a subset of beams from the set of beams, wherein the subset of beams are associated with a spatial direction toward the second cell with respect to a location of the first cell.

In a sixth aspect, alone or in combination with one or more of the first through fifth aspects, process 800 includes transmitting one or more possible sets of system information associated with respective index values, and transmitting the system information associated with the second cell comprises transmitting, via the first cell, an indication of an index value, from the respective index values, that is associated with a system information set, from the one or more possible sets of system information, that includes the system information.

In a seventh aspect, alone or in combination with one or more of the first through sixth aspects, the one or more system information sets are included in an initial attachment communication, a radio resource control communication, or a tracking area update communication.

In an eighth aspect, alone or in combination with one or more of the first through seventh aspects, the system information associated with the second cell is first system information, and second system information associated with the second cell is not transmitted via the first cell.

In a ninth aspect, alone or in combination with one or more of the first through eighth aspects, the first system information includes at least one of celling barring information, or an IFRI.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
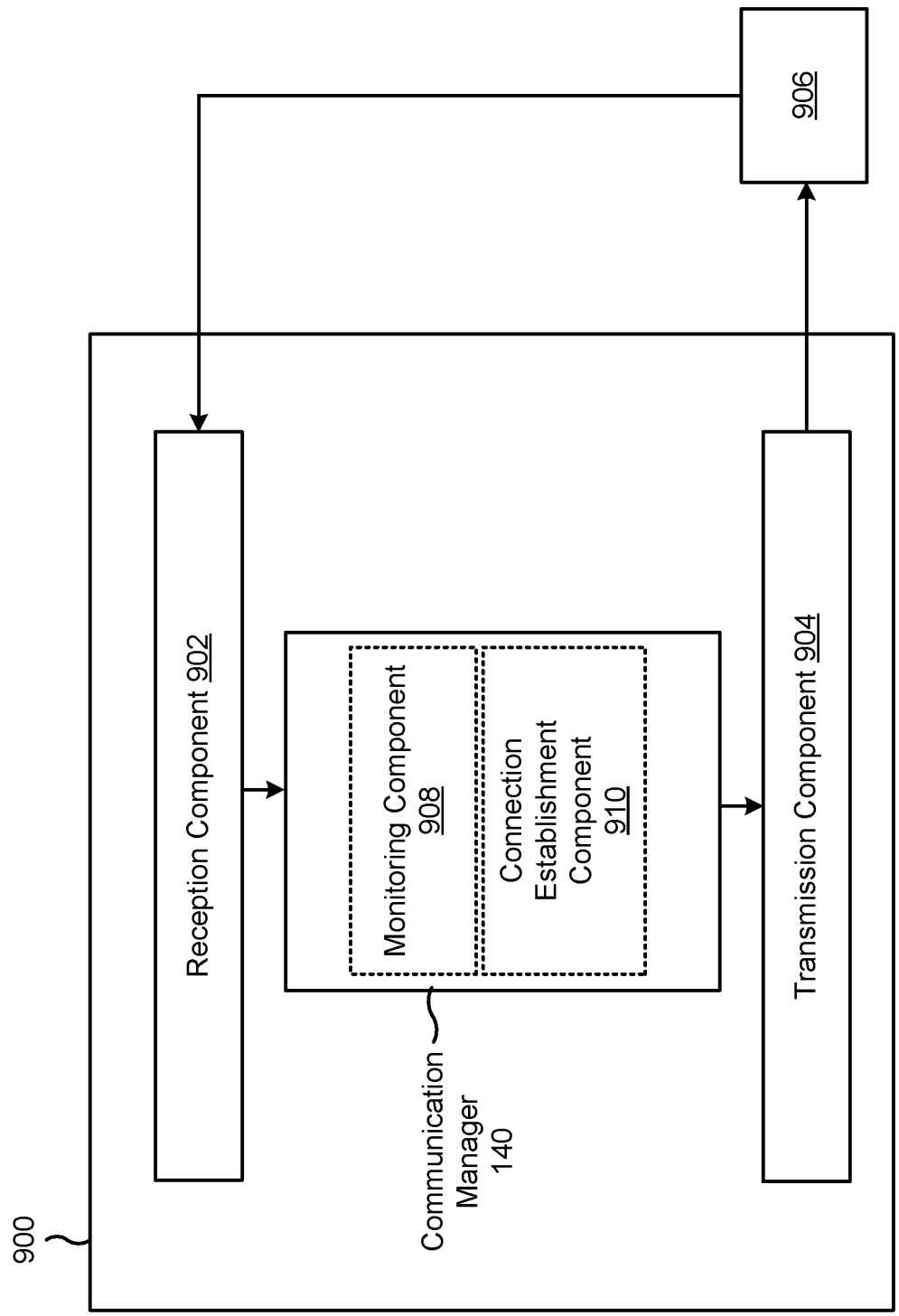
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a monitoring component 908, and/or a connection establishment component 910, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive configuration information associated with a cell selection or reselection procedure, the configuration information indicating first policy information associated with cell selections and second policy information associated with RRM measurements. The monitoring component 908 may monitor, in an idle mode, a broadcast channel associated with a first cell based at least in part on selecting the first cell in accordance with the configuration information. The reception component 902 may receive, from the first cell, system information associated with a second cell. The connection establishment component 910 may establish a connection with the second cell based at least in part on the system information and one or more RRM measurements performed in accordance with the configuration information.

The transmission component 904 and/or the reception component 902 may communicate one or more signals associated with establish the connection with the second cell.

The reception component 902 may receive one or more system information sets associated with respective index values.

The quantity and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
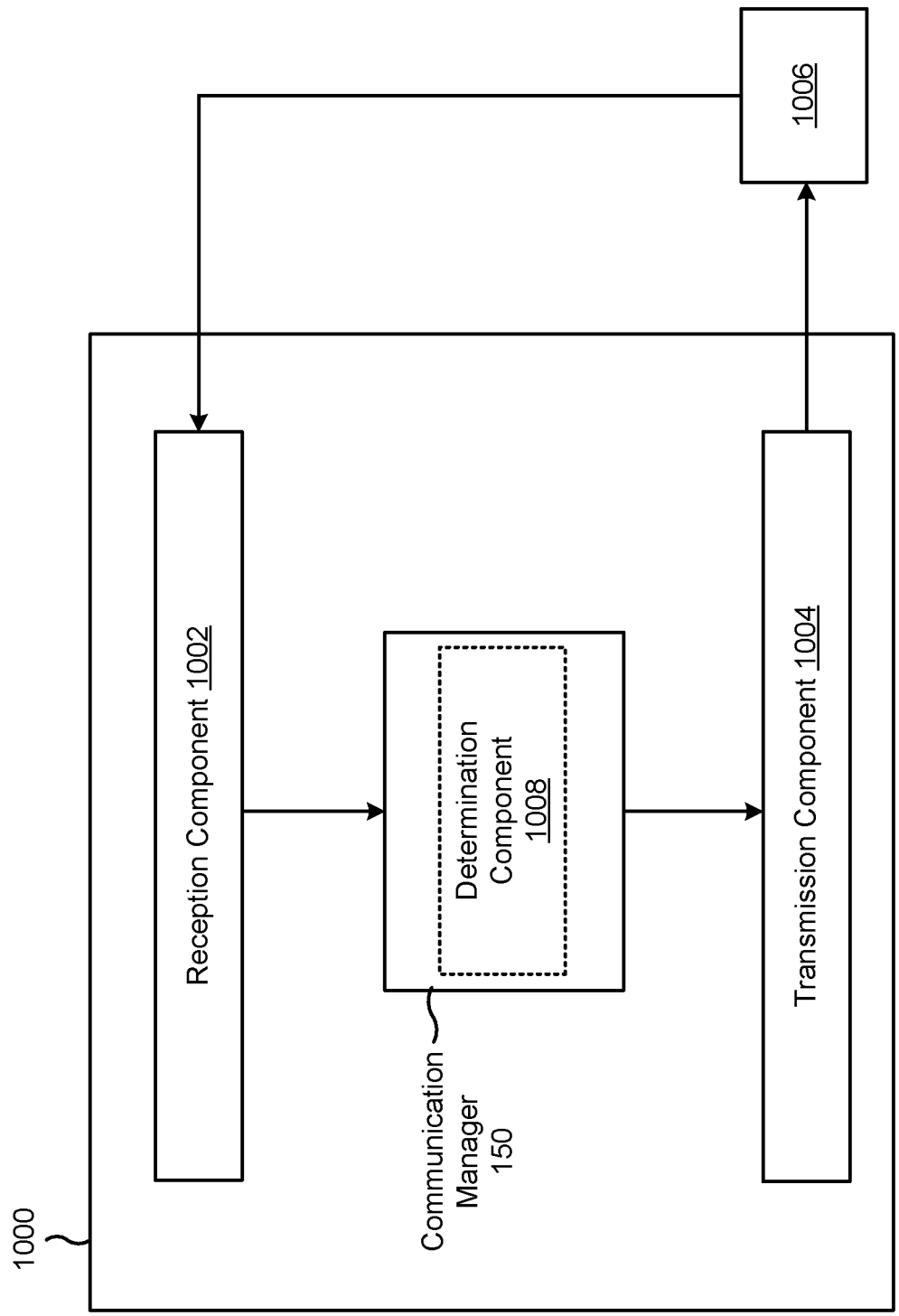
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a determination component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The reception component 1002 may receive one or more sets of system information associated with one or more cells, the one or more cells being associated with the network node or another network node. The transmission component 1004 may transmit, via a first cell associated with the network node, system information, from the one or more sets of system information associated with a second cell from the one or more cells.

The transmission component 1004 may transmit configuration information associated with a cell reselection procedure, the configuration information indicating first policy information associated with cell selections and second policy information associated with RRM measurements.

The determination component 1008 may determine the configuration information.

The transmission component 1004 may transmit one or more possible sets of system information associated with respective index values.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by an apparatus of a user equipment (UE), comprising: receiving configuration information associated with a cell selection or reselection procedure, the configuration information indicating first policy information associated with cell selections and second policy information associated with radio resource management (RRM) measurements; monitoring, in an idle mode, a broadcast channel associated with a first cell based at least in part on selecting the first cell in accordance with the configuration information; receiving, from the first cell, system information associated with a second cell; and establishing a connection with the second cell based at least in part on the system information and one or more RRM measurements performed in accordance with the configuration information.

Aspect 2: The method of Aspect 1, wherein the first policy information indicates that a first type of cell is permitted to be selected for monitoring the broadcast channel and that a second type of cell is not permitted to be selected for monitoring the broadcast channel, and wherein the second policy information indicates that the first type of cell is associated with a first priority level and that the second type of cell is associated with a second priority level for the RRM measurements.

Aspect 3: The method of Aspect 2, wherein the first type of cell is associated with a first frequency band and the second type of cell is associated with a second frequency band.

Aspect 4: The method of any of Aspects 1-3, wherein the system information associated with the second cell is first system information, and wherein receiving the system information associated with the second cell comprises: receiving, from the first cell, an indication of the first system information as differential information relative to second system information associated with the first cell.

Aspect 5: The method of any of Aspects 1-4, wherein the first cell is associated with a set of beams, and wherein receiving the system information associated with the second cell comprises: receiving, from the first cell, an indication of the system information via a beam included in a subset of beams from the set of beams, wherein the subset of beams are associated with a spatial direction toward the second cell with respect to a location of the first cell.

Aspect 6: The method of any of Aspects 1-5, further comprising: receiving one or more system information sets associated with respective index values, and wherein receiving the system information associated with the second cell comprises: receiving, from the first cell, an indication of an index value, from the respective index values, that is associated with a system information set, from the one or more system information sets, that includes the system information.

Aspect 7: The method of Aspect 6, wherein the one or more system information sets are included in an initial attachment communication, a radio resource control communication, or a tracking area update communication.

Aspect 8: The method of any of Aspects 1-7, wherein the system information associated with the second cell is first system information, the method further comprising: receiving, from the second cell, second system information associated with the second cell after establishing the connection.

Aspect 9: The method of Aspect 8, wherein the first system information is access control information that includes at least one of: cell barring information, or an intra-frequency reselection indication (IFRI); and wherein the access control information is received via a random access procedure, with the first cell, that is configured for requesting system information.

Aspect 10: The method of any of Aspects 1-9, wherein establishing the connection comprises: performing, while camping on the first cell, the one or more RRM measurements in accordance with the configuration information; selecting the second cell, from one or more cells associated with the one or more RRM measurements, based at least in part on the one or more RRM measurements; and establishing the connection with the second cell without establishing a connected radio resource control connection with the first cell.

Aspect 11: A method of wireless communication performed by an apparatus of a network node, comprising: receiving one or more sets of system information associated with one or more cells, the one or more cells being associated with the network node or another network node; and transmitting, via a first cell associated with the network node, system information, from the one or more sets of system information associated with a second cell from the one or more cells.

Aspect 12: The method of Aspect 11, further comprising: transmitting configuration information associated with a cell selection or reselection procedure, the configuration information indicating first policy information associated with cell selections and second policy information associated with radio resource management (RRM) measurements.

Aspect 13: The method of Aspect 12, wherein the first policy information indicates that a first type of cell is permitted to be selected for camping and that a second type of cell is not permitted to be selected for camping, and wherein the second policy information indicates that the first type of cell is associated with a first priority level and that the second type of cell is associated with a second priority level for the RRM measurements.

Aspect 14: The method of Aspect 13, wherein the first type of cell is associated with a first frequency band and the second type of cell is associated with a second frequency band.

Aspect 15: The method of any of Aspects 11-14, wherein the system information associated with the second cell is first system information, and wherein transmitting the system information associated with the second cell comprises: transmitting, via the first cell, an indication of the first system information as differential information relative to second system information associated with the first cell.

Aspect 16: The method of any of Aspects 11-15, wherein the network node is associated with a set of beams available for transmissions, and wherein transmitting the system information associated with the second cell comprises: transmitting an indication of the system information via a subset of beams from the set of beams, wherein the subset of beams are associated with a spatial direction toward the second cell with respect to a location of the first cell.

Aspect 17: The method of any of Aspects 11-16, further comprising: transmitting one or more possible sets of system information associated with respective index values, and wherein transmitting the system information associated with the second cell comprises: transmitting, via the first cell, an indication of an index value, from the respective index values, that is associated with a system information set, from the one or more possible sets of system information, that includes the system information.

Aspect 18: The method of Aspect 17, wherein the one or more system information sets are included in an initial attachment communication, a radio resource control communication, or a tracking area update communication.

Aspect 19: The method of any of Aspects 11-18, wherein the system information associated with the second cell is first system information, and wherein second system information associated with the second cell is not transmitted via the first cell.

Aspect 20: The method of Aspect 19, wherein the first system information includes at least one of: cell barring information, or an intra-frequency reselection indication (IFRI).

Aspect 21: An apparatus for wireless communication at a device, comprising a processor; memory coupled with the processor; and instructions stored in the memory and executable by the processor to cause the apparatus to perform the method of one or more of Aspects 1-10.

Aspect 22: A device for wireless communication, comprising a memory and one or more processors coupled to the memory, the one or more processors configured to perform the method of one or more of Aspects 1-10.

Aspect 23: An apparatus for wireless communication, comprising at least one means for performing the method of one or more of Aspects 1-10.

Aspect 24: A non-transitory computer-readable medium storing code for wireless communication, the code comprising instructions executable by a processor to perform the method of one or more of Aspects 1-10.

Aspect 25: A non-transitory computer-readable medium storing a set of instructions for wireless communication, the set of instructions comprising one or more instructions that, when executed by one or more processors of a device, cause the device to perform the method of one or more of Aspects 1-10.

Aspect 26: An apparatus for wireless communication at a device, comprising a processor; memory coupled with the processor; and instructions stored in the memory and executable by the processor to cause the apparatus to perform the method of one or more of Aspects 11-20.

Aspect 27: A device for wireless communication, comprising a memory and one or more processors coupled to the memory, the one or more processors configured to perform the method of one or more of Aspects 11-20.

Aspect 28: An apparatus for wireless communication, comprising at least one means for performing the method of one or more of Aspects 11-20.

Aspect 29: A non-transitory computer-readable medium storing code for wireless communication, the code comprising instructions executable by a processor to perform the method of one or more of Aspects 11-20.

Aspect 30: A non-transitory computer-readable medium storing a set of instructions for wireless communication, the set of instructions comprising one or more instructions that, when executed by one or more processors of a device, cause the device to perform the method of one or more of Aspects 11-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors coupled with the memory and configured to cause the UE to:
receive configuration information associated with a cell selection or reselection procedure, the configuration information indicating:
first policy information associated with cell selections, wherein the first policy information indicates that a cell associated with a first frequency band is to be selected as a serving cell for operating in an idle mode, and
second policy information indicating that a first type of cell, associated with a first frequency band, is associated with a first priority for radio resource management (RRM) measurements and that a second type of cell, associated with a second frequency band, is associated with a second priority;

monitor, in the idle mode, a broadcast channel associated with a first cell operating on the first frequency band, in accordance with the configuration information;

receive, via the broadcast channel of the first cell, system information that is associated with a second cell distinct from the first cell, the second cell being operable on a different frequency band or associated with a different type of cell; and establish a connection with the second cell based at least in part on the system information and one or more RRM measurements performed in accordance with the configuration information.

2. The UE of claim 1, wherein the first policy information indicates that the first type of cell is permitted to be selected for monitoring the broadcast channel and that the second type of cell is not permitted to be selected for monitoring the broadcast channel.

3. The UE of claim 1, wherein the system information associated with the second cell comprises first system information, and wherein the one or more processors, to cause the UE to receive the system information associated with the second cell, are configured to cause the UE to:

receive, from the first cell, an indication of the first system information as differential information relative to second system information associated with the first cell.

4. The UE of claim 1, wherein the first cell is associated with a set of beams, and wherein the one or more processors, to cause the UE to receive the system information associated with the second cell, are configured to cause the UE to:

receive, from the first cell, an indication of the system information via a beam included in a subset of beams from the set of beams, wherein the subset of beams is associated with a spatial direction toward the second cell with respect to a location of the first cell.

5. The UE of claim 1, wherein the one or more processors are further configured to cause the UE to:

receive one or more system information sets associated with respective index values, and wherein the one or more processors, to cause the UE to receive the system information associated with the second cell, are configured to cause the UE to:

receive, from the first cell, an indication of an index value, from the respective index values, that is associated with a system information set, from the one or more system information sets, that includes the system information.

6. The UE of claim 5, wherein the one or more system information sets are included in an initial attachment communication, a radio resource control communication, or a tracking area update communication.

7. The UE of claim 1, wherein the system information associated with the second cell comprises first system information, and wherein the one or more processors are further configured to cause the UE to:

receive, from the second cell, second system information associated with the second cell after establishing the connection.

8. The UE of claim 7, wherein the first system information comprises access control information that includes at least one of:

cell barring information, or an intra-frequency reselection indication (IFRI); and wherein the access control information is received via a random access procedure, with the first cell, that is configured for requesting system information.

9. The UE of claim 1, wherein the one or more processors, to cause the UE to establish the connection, are configured to cause the UE to:

perform, while camping on the first cell, the one or more RRM measurements in accordance with the configuration information;

select the second cell, from one or more cells associated with the one or more RRM measurements, based at least in part on the one or more RRM measurements; and establish the connection with the second cell without establishing a connected radio resource control connection with the first cell.

10. The UE of claim 1, wherein the second policy information indicates that cells associated with the first frequency band are to be prioritized for RRM measurements when measurements of cells associated with the second frequency band and the first frequency band are being performed.

11. A network node for wireless communication, comprising:

a memory; and one or more processors coupled with the memory and configured to cause the network node to:

receive system information associated with a first cell, the first cell being associated with the network node or another network node; and transmit, to a user equipment (UE), via a broadcast channel of a second cell associated with the network node and operating on a first frequency band, the system information associated with the first cell, wherein the system information associated with the first cell comprises:

first policy information associated with cell selections, wherein the first policy information indicates that a cell associated with the first frequency band is to be selected as a serving cell for operating in an idle mode, and second policy information indicating that a first type of cell, associated with the first frequency band, is associated with a first priority for radio resource management (RRM) measurements and that a second type of cell, associated with a second frequency band, is associated with a second priority for RRM measurements.

12. The network node of claim 11, wherein the one or more processors are further configured to cause the network node to:

transmit configuration information associated with a cell selection or reselection procedure.

13. The network node of claim 11, wherein the first policy information indicates that the first type of cell is permitted to be selected for camping and that the second type of cell is not permitted to be selected for camping.

14. The network node of claim 11, wherein the system information associated with the first cell comprises first system information, and wherein the one or more processors, to cause the network node to transmit the system information associated with the first cell, are configured to cause the network node to:

transmit, via the second cell, an indication of the first system information as differential information relative to second system information associated with the second cell.

15. The network node of claim 11, wherein the network node is associated with a set of beams available for transmissions, and wherein the one or more processors, to cause the network node to transmit the system information associated with the first cell, are configured to cause the network node to:
    transmit an indication of the system information via a subset of beams from the set of beams, wherein the subset of beams is associated with a spatial direction toward the first cell with respect to a location of the second cell.

16. A method of wireless communication performed by an apparatus of a user equipment (UE), comprising:
    receiving configuration information associated with a cell selection or reselection procedure, the configuration information indicating:
        first policy information associated with cell selections, wherein the first policy information indicates that a cell associated with a first frequency band is to be selected as a serving cell for operating in an idle mode, and
        second policy information indicating that a first type of cell, associated with a first frequency band, is associated with a first priority for radio resource management (RRM) measurements and that a second type of cell, associated with a second frequency band, is associated with a second priority for RRM measurements;
    monitoring, in the idle mode, a broadcast channel associated with the first frequency band in accordance with the configuration information;
    receiving, from a first cell corresponding to the first frequency band, system information associated with a second cell; and
    establishing a connection with the second cell based at least in part on the system information and one or more RRM measurements performed in accordance with the configuration information.

17. The method of claim 16, wherein the first policy information indicates that the first type of cell is permitted to be selected for monitoring the broadcast channel and that the second type of cell is not permitted to be selected for monitoring the broadcast channel.

18. The method of claim 16, wherein the system information associated with the second cell comprises first system information, and wherein receiving the system information associated with the second cell comprises:
    receiving, from the first cell, an indication of the first system information as differential information relative to second system information associated with the first cell.

19. The method of claim 16, wherein the first cell is associated with a set of beams, and wherein receiving the system information associated with the second cell comprises:
    receiving, from the first cell, an indication of the system information via a beam included in a subset of beams from the set of beams, wherein the subset of beams is associated with a spatial direction toward the second cell with respect to a location of the first cell.

20. The method of claim 16, further comprising:
    receiving one or more system information sets associated with respective index values, and
    wherein receiving the system information associated with the second cell comprises:
        receiving, from the first cell, an indication of an index value, from the respective index values, that is associated with a system information set, from the one or more system information sets, that includes the system information.

21. The method of claim 20, wherein the one or more system information sets are included in an initial attachment communication, a radio resource control communication, or a tracking area update communication.

22. The method of claim 16, wherein the system information associated with the second cell comprises first system information, the method further comprising:
    receiving, from the second cell, second system information associated with the second cell after establishing the connection.

23. The method of claim 22, wherein the first system information comprises access control information that includes at least one of:
    cell barring information, or
    an intra-frequency reselection indication (IFRI); and
    wherein the access control information is received via a random access procedure, with the first cell, that is configured for requesting system information.

24. The method of claim 16, wherein establishing the connection comprises:
    performing, while camping on the first cell, the one or more RRM measurements in accordance with the configuration information;
    selecting the second cell, from one or more cells associated with the one or more RRM measurements, based at least in part on the one or more RRM measurements; and
    establishing the connection with the second cell without establishing a connected radio resource control connection with the first cell.

25. The method of claim 16, wherein the second policy information indicates that cells associated with the first frequency band are to be prioritized for RRM measurements when measurements of cells associated with the second frequency band and the first frequency band are being performed.

26. A method of wireless communication performed by an apparatus of a network node, comprising:
    receiving system information associated with a first cell, the first cell being associated with the network node or another network node; and
    transmitting, to a user equipment (UE), via a broadcast channel of a second cell associated with the network node and operating on a first frequency band, the system information associated with the first cell, wherein the system information associated with the first cell comprises:
        first policy information associated with cell selections, wherein the first policy information indicates that a cell associated with the first frequency band is to be selected as a serving cell for operating in an idle mode, and
        second policy information indicating that a first type of cell, associated with the first frequency band, is associated with a first priority for radio resource management (RRM) measurements and that a second type of cell, associated with a second frequency band, is associated with a second priority for RRM measurements.

27. The method of claim 26, further comprising:
    transmitting configuration information associated with a cell selection or reselection procedure.

28. The method of claim 26, wherein the network node is associated with a set of beams available for transmissions, and wherein transmitting the system information associated with the first cell comprises:

transmitting an indication of the system information via a subset of beams from the set of beams, wherein the subset of beams is associated with a spatial direction toward the first cell concerning a location of the second cell.

29. The method of claim 26, further comprising:
transmitting one or more possible sets of system information associated with respective index values, and
wherein transmitting the system information associated with the first cell comprises:
transmitting, via the second cell, an indication of an index value, from the respective index values, that is associated with a system information set, from the one or more possible sets of system information, that includes the system information.

30. The method of claim 26, wherein the system information associated with the first cell comprises first system information, and wherein second system information associated with the first cell is transmitted from the first cell to the UE, and not transmitted via the second cell.

* * * * *